Patented Sept. 6, 1949

2,480,985

UNITED STATES PATENT OFFICE 2,480,985

ACID DYESTUFFS OF THE ANTHRAQUINONE SERIES AND A PROCESS OF MAKING SAME

Samuel von Allmen and Hans Eggenberger, Basel, Switzerland, assignors to Sandoz Limited, Basel, Switzerland, a Swiss firm No Drawing. Application July 7, 1947, Serial No. 759,470. In Switzerland July 26, 1946

8 Claims. (Cl. 260—374)

The present invention relates to new acid anthraquinone dyestuffs which possess especially good fastness properties to light, washing and milling and to a process for their manufacture.

It has been found that new anthraquinone dyestuffs can be obtained by treating anthraquinone compounds of the general formula

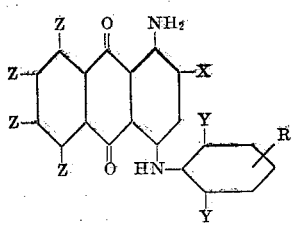

wherein X stands for halogen or sulfo, Y stands for alkyl, R stands for hydrogen, alkyl or halogen and one Z stands for a sulfonic acid group, the other Z being hydrogen, with halogenating agents.

As halogenating agents are preferably used chlorine, bromine, sulfuryl chloride, sulfuryl bromide and the like and the halogenation is preferably carried out in the presence of sulfuric acid of any desired concentrations, sulfuric acid monohydrate or dilute fuming sulfuric acid. Sometimes it is advantageous to add to the halogenation medium halogenating catalysts like iodine, antimony trichloride, iron or iron salts and the like. The halogenation process itself is carried out at temperatures ranging from 0° to 100° C.; sometimes it may be advantageous to first work at a temperature range from 0° to 40° C. and to increase the temperature from 40° to 100° C. for the final stage of the halogenation step. In the cases, where in the general formula X stands for a halogen atom, this halogen atom is replaced by a sulfonic acid group by treating the halogenating products with an alkali sulfite, preferably under pressure. As starting products that can be used according to the present invention the following compounds may be cited: 1-amino-4-(2':6' - dimethylanilido) - anthraquinone - 2:5-, -2:6, -2:7- and -2:8-disulfonic acids, 1-amino-4-(2':4':6'-trimethylanilido) - anthraquinone-2:5-, -2:6-, -2:7- and -2:8-disulfonic acids, 1-amino-4-(2':3':6'-trimethylanilido) - anthraquinone-2:5-, -2:6-, -2:7- and -2:8-disulfonic acids, 1-amino-4-(2':6'-dimethyl - 3'(4') - chloranilido) - anthraquinone-2:5-, -2:6-, -2:7- and -2:8-disulfonic acids. Instead of the methyl-substituted compounds derivatives containing other alkyl groups, like ethyl, can be used. It is self-evident that, instead of the free sulfonic acids, also their salts can be employed as starting materials.

The following examples, without being limitative, illustrate the present invention; the parts are parts by weight.

Example 1

5.8 parts of the potassium salt of 1-amino-4-(2':6' - dimethylanilido) - anthraquinone - 2:6-disulfonic acid are dissolved at room temperature with stirring in 50 parts of sulfuric acid 90 per cent. Thereupon 1.8 parts of bromine are added thereto, the whole is stirred over night at 20–30° C. and for further 3 hours at 40° C. The brominated dyestuff is isolated in the usual manner, for instance by pouring the charge into a mixture of ice and water, or by diluting it with some water, whereby the dyestuff precipitates. The new dyestuff crystallizes in reddish-blue needles which are easily soluble in water with a brilliant greenish-blue shade. Its solution in conc. sulfuric acid is dull reddish-blue and becomes transformed into a brilliant reddish-blue after addition of some paraformaldehyde. The dyestuff dyes animal fibres, like wool and silk, and synthetic fibres, like nylon, into brilliant blue shades possessing excellent fastness properties.

Instead of the anthraquinone compound used in this example, its isomers containing the sulfo groups in 2:5-, -2:7- or 2:8-position or 1-amino-4-(2':6'-diethyl- or -methylethylanilido) - anthraquinone-2:5-, -2:6-, -2:7-, -2:8-disulfonic acids can be used. The shades of the dyestuffs obtained from 2:6- and 2:7-disulfonic acids are similar, whereas the products obtained from 2:5- and 2:8-disulfo-derivatives give redder shades.

If in this example the quantity of bromine is increased up to 3.6 parts, a redder dyestuff possessing the same excellent fastness properties will be obtained.

Example 2

5.8 parts of the sodium salt of 1-amino-4-(2':4':6'-trimethylanilido) - anthraquinone-2:5-disulfonic acid are dissolved at room temperature with stirring in 30 parts of sulfuric acid monohydrate, 1.8 parts of bromine are added thereto and the charge stirred over night at 20–30° C. and at the end of the reaction phase for 1–2 hours at 100° C. The brominated dyestuff is isolated in the manner described in Example 1. The new dyestuff is obtained in reddish-blue needles which are easily soluble in water with a brilliant greenish-blue shade. Its solution in concentrated sulfuric acid is dull reddish-blue, but becomes brilliant reddish-blue on addition of some paraformaldehyde.

The resultant dyestuff dyes animal fibres and nylon in brilliant reddish-blue of excellent fastness properties.

Similar dyestuffs will be obtained by using, instead of the anthraquinone compound of this example, its isomers containing the sulfo groups in 2:6-, 2:8-position or by using 1-amino-4-(2':4':6'-triethyl- or -methyldiethyl- or -dimethylethylanilido) - anthraquinone-2:5-, -2:6-, -2:7- and -2:8-disulfonic acids. The dyestuffs obtained from 2:5- and 2:8- disulfonated derivatives dye animal fibres in redder shades than the other isomers.

Example 3

5 parts of 1-amino-2-brom-4-(2':6'-dimethyl-4' - chloranilidoanthraquinone) - 7-sulfonic acid are dissolved, while thoroughly stirring, in 25 parts of fuming sulfuric acid containing 1–2 per cent $SO_3$; after addition of 0.05 part of iodine a slow current of chlorine is passed through the solution and, after completion of the chlorination, the dyestuff is isolated in the manner described above. This dyestuff still contains in 2-position a bromine atom, which is then replaced by a sulfonic acid group by heating it under pressure with potassium sulfite.

The disulfonated dyestuff thus obtained dyes wool in very fast pure reddish-blue shades.

Instead of the anthraquinone compound used in this example, its isomers containing the sulfo group in 5-, 6- or 8-position can be used.

Similar dyestuffs will be obtained by using 1-amino-2-brom-4-(2':6'-dimethyl- or -diethyl-3' - or 4' - methyl- or -ethylanilidoanthraquinone)-5:6:7- or -8-sulfonic acids. Instead of chlorine one can use a corresponding quantity of sulfuryl chloride.

Example 4

5.8 parts of the sodium salt of 1-amino-4-(2':4':6' - trimethylanilido) - anthraquinone-2:6-disulfonic acid are dissolved with thorough stirring at room temperature in 50 parts of sulfuric acid 85 per cent. This solution is then treated at 20–30° C. with thorough stirring with 1.5 parts of chlorine, the temperature being increased at the end of the chlorination step for 1 hour to 60–100° C. The chlorinated dyestuff thus obtained is isolated in the usual manner by pouring the charge into a mixture of ice and water or by precipitating the acidic sulfonic acid salt by means of addition of some water. The new dyestuff is obtained in form of reddish-blue needles which are easily soluble in water with a brilliant blue shade. Its solution in concentrated sulfuric acid is dull reddish-blue, but turns to a brilliant reddish-blue on addition of some paraformaldehyde. It dyes animal fibres and nylon in brilliant reddish-blue shades possessing excellent fastness properties.

Similar dyestuff will be obtained, when instead of the anthraquinone compound used in this example use is made of the 2:5-, -2:7- or -2:8-disulfonic acids or 1-amino-4-(2':4':6'-triethyl- or -methyldiethyl- or dimethylethylanilido) - anthraquinone-2:5-, -2:6-, -2:7- and -2:8-disulfonic acids. The dyestuffs obtained from the starting products containing the sufonic groups in position 2:5 and 2:8 dye the fibres in more reddish shades than their isomers.

What we claim is:

1. A process for the manufacture of new acid dyestuffs of the anthraquinone series comprising the step of treating with halogenating agents an anthraquinone compound of the general formula

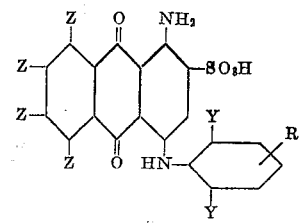

wherein Y stands for alkyl, R stands for a substituent selected from the group consisting of hydrogen, alkyl and halogen, and wherein one Z stands for a sulfo group, the other Z being hydrogen, in presence of sulfuric acid of any desired concentration as diluting agent.

2. A process for the manufacture of a new acid dyestuff of the anthraquinone series comprising the step of treating at 20–100° C. 1-amino-4-(2':4':6' - trimethylanilido)anthraquinone - 2:6-disulfonic acid with bromine in sulfuric acid as diluting medium.

3. A process for the manufacture of a new acid dyestuff of the anthraquinone series comprising the step of treating at 20–100° C. 1-amino-4-(2':6'-diethylanilido) - anthraquinone - 2:8 - disulfonic acid with bromine in sulfuric acid as diluting medium.

4. A process for the manufacture of a new acid dyestuff of the anthraquinone series comprising the step of treating at 20–100° C. 1-amino-4-(2':4':6'-trimethylanilido)-anthraquinone - 2:6-disulfonic acid with chlorine in sulfuric acid as diluting medium.

5. As new articles of manufacture the acid dyestuffs of the anthraquinone series of the general formula

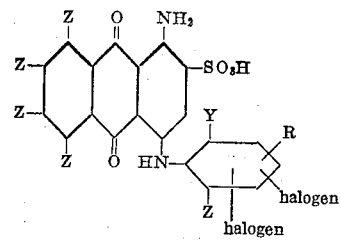

wherein Y stands for alkyl, R stands for a substituent selected from the group consisting of hydrogen, alkyl and halogen and wherein one Z stands for a sulfo group, the other Z being hydrogen, each halogen standing for a member selected from the group consisting of chlorine and bromine, which dyestuffs are, in the dry state, dark blue needles being easily soluble in water with a brilliant blue coloration and in concentrated sulfuric acid with a dull blue coloration, which turns to a brilliant blue on addition of paraformaldehyde, which dyestuffs dye animal and synthetic nitrogen-containing fibres into fast blue shades.

6. The acid dyestuff of the anthraquinone series of the formula

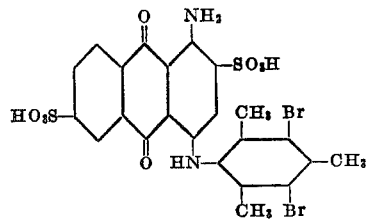

7. The acid dyestuff of the anthraquinone series of the formula

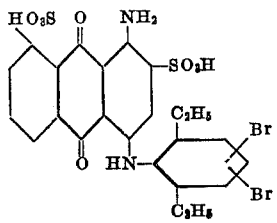

8. The acid dyestuff of the anthraquinone series of the formula

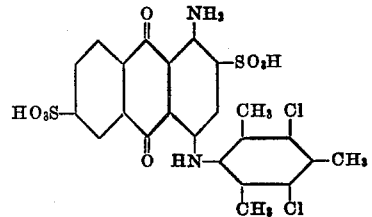

SAMUEL VON ALLMEN.
HANS EGGENBERGER.

REFERENCES CITED

The following references are of record in the file of this patent:

UNITED STATES PATENTS

| Number | Name | Date |
| --- | --- | --- |
| 1,885,065 | Von Allmen | Oct. 25, 1932 |
| 1,898,861 | Von Allmen | Feb. 21, 1933 |
| 1,901,048 | Von Allmen | Mar. 14, 1933 |
| 2,121,928 | Peter | June 28, 1938 |
| 2,226,909 | Peter | Dec. 31, 1940 |
| 2,412,790 | Von Allmen et al. | Dec. 17, 1946 |
| 2,427,527 | Gutzwiller | Sept. 16, 1947 |

Certificate of Correction

September 6, 1949

Patent No. 2,480,985

SAMUEL von ALLMEN ET AL.

It is hereby certified that error appears in the printed specification of the above numbered patent requiring correction as follows:

Column 3, line 19, after "2:6-," insert *2:7- and*;

and that the said Letters Patent should be read with this correction therein that the same may conform to the record of the case in the Patent Office.

Signed and sealed this 14th day of March, A. D. 1950.

[SEAL]

THOMAS F. MURPHY,
*Assistant Commissioner of Patents.*